March 5, 1963     A. S. SMITH     3,080,162
MITERED CASING CLAMP
Filed Feb. 16, 1960
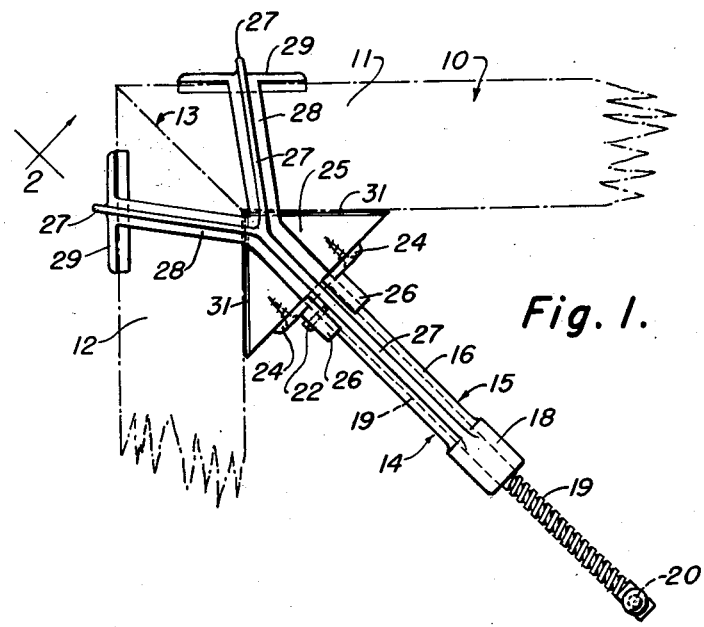
Fig. 1.
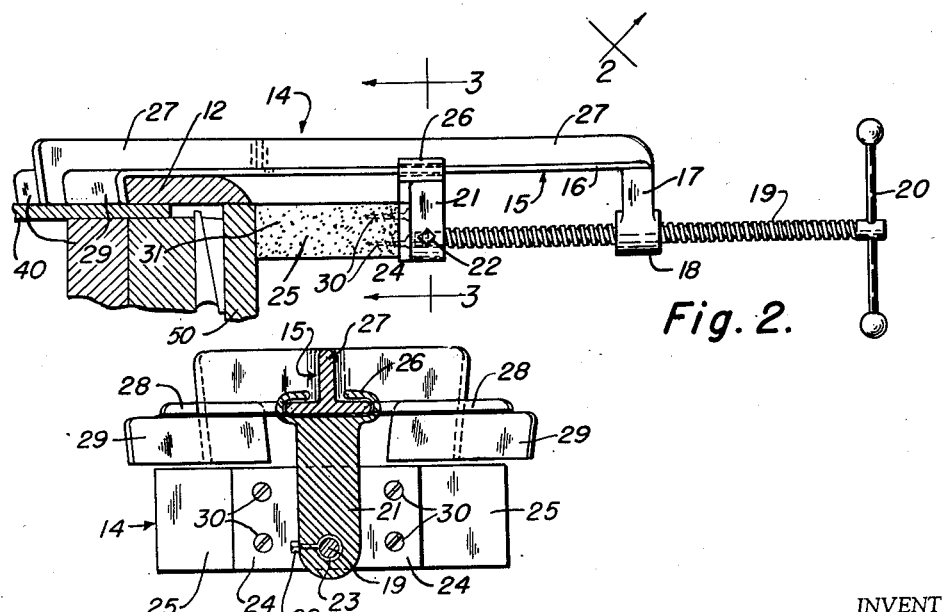
Fig. 2.
Fig. 3.
INVENTOR.
Arthur Sam Smith
BY Victor J. Evans & Co.
ATTORNEYS

United States Patent Office 3,080,162
Patented Mar. 5, 1963

3,080,162
MITERED CASING CLAMP
Arthur Sam Smith, 1924 Adirondack St.,
Duluth 11, Minn.
Filed Feb. 16, 1960, Ser. No. 9,124
1 Claim. (Cl. 269—251)

This invention relates to a clamp, and more particularly to a clamp for holding frame members of a door, window or the like in place while the same are being fastened together or worked on.

The object of the invention is to provide a clamp which is especially useful by carpenters and the like wherein mitered door and window casings can be brought tightly together and held firmly in place while they are being nailed or otherwise fastened together.

Another object of the invention is to provide a mitered casing clamp which will permit the user to obtain a tight joint between the members which are being fastened together.

A further object of the invention is to provide a mitered casing clamp which is extremely simple and inexpensive to manufacture.

Other objects and advantages will be apparent in the course of the following description.

In the accompanying drawings, forming a part of this application, and in which like numerals are used to designate like parts throughout the same.

FIGURE 1 is a plan view illustrating the mitered casing clamp of the present invention being used.

FIGURE 2 is a side elevational view of the mitered casing clamp of this invention and taken on the line 2—2 of FIGURE 1.

FIGURE 3 is a sectional view taken on the line 3—3 of FIGURE 2.

Referring in detail to the drawings, numeral 10 indicates a portion of a window, door frame or the like which includes the usual casings or members 11 and 12 which are adapted to be brought together as for example to form a corner joint 13, and according to the present invention there is provided a clamp which is indicated generally by the numeral 14 which serves to maintain the members 11 and 12 in their proper positions so that these members can be nailed or otherwise fastened together in such a manner that a perfectly tight joint 13 is provided.

As shown in the drawings the clamp 14 embodies a body member 15 which includes a main straight portion 16 that has a transversely disposed section 17 on one end thereof, and the section 17 is provided with a bearing 18, there being a screw member 19 arranged in threaded engagement with the bearing 18, and the screw member 19 has a handle 20 on one end thereof.

There is further provided a support member 21 which is connected to an end of the screw member 19, and the numeral 22 indicates a securing element or set screw which extends through the support member 21 and engages an annular groove 23 in the end of the screw member 19 so as to prevent the screw member 19 from becoming separated from the support member 21. The support member 21 is provided with lips 24, and the numeral 25 indicates a wedge-shaped block which is secured to the lips 24, as for example by means of securing elements or screws 30, or else the members 25 and 21 may be made of one piece integral construction. The support member 21 is provided with opposed curved fingers or flanges 26 which slidably engage or receive the main straight portion 16 of the body member 15, FIGURE 2. As shown in FIGURE 2, the casing member 12 is in abutting relation with the wall 40 and has one end portion overlying the adjacent side edge of the jamb 50 to which it is to be nailed in order to complete the construction of the door or window structure. The positioning of the block 25 in the offset relation with respect to the jaws 29 permits the clamping of the members 11 and 12 together over the side edge of the jamb even if their inner edges overlap the jamb and project into the door or window opening. Later planing of the projecting edges flush with the jamb will give the desired finished appearance to the casing members. It is to be understood that the other ends or intermediate parts of the members 11 and 12 are temporarily clamped or otherwise supported on the sides of the door or window opening prior to attaching the tool of the present invention.

As shown in the drawings there is provided a longitudinally extending stiffening rib 27 which extends longitudinally along the member 15 and such stiffening ribs are also provided for the pair of angularly arranged arms 28, the arms 28 being arranged on the end of the portion 16, as shown in FIGURE 1 for example. Each of the arms 28 are provided with angularly arranged jaws 29 and the stiffening ribs also extend along these jaws, and as shown in FIGURE 1 for example the wedge-shaped block 25 is adapted to engage the inner surfaces of the frame while the jaws 29 are adapted to engage the outer surfaces in order to maintain the parts in their proper position.

The pair of arms 28 are arranged at an angle of approximately seventy-five degrees with respect to each other. The jaws 29 are arranged at an angle of approximately eighty degrees with respect to the arms 28. This disposes the jaws 29 at an angle of 82½ degrees with respect to each other. The casing members 11 and 12 are to be secured at right angles to each other so that the disposition of the jaws at 82½ degrees relative to each other results in each jaw being disposed at an angle of 3¾ degrees relative to the adjacent edge of the casing member which effectively prevents slipping of the one casing member in the direction toward the other casing member. The wedge-shaped block 25 is adapted to be provided with a suitable material such as sand paper, a rubber-like substance or the like so as to increase the gripping or holding power thereof, and this material may be indicated by the numeral 31.

As shown in FIGURE 1 the arms 28 are arranged in such a manner so that the user has complete vision of the joint 13 in order to permit the user to carry out the work with greater facility.

From the foregoing, it is apparent that there has been provided a clamp which is especially suitable for use in holding members together as for example members such as the members 11 and 12 which are to be fastened together at the joint 13 by means of nails or the like. The clamp of the present invention will hold these members tightly and accurately in place so that a tight and perfect joint will be provided whereby nails can be used for permanently fastening the members together and then the clamp 14 is adapted to be removed so that it can be used over and over again. The clamp is especially suitable for use in making door, window frames or the like and the clamp is especially suitable for use by people in the carpentry field.

It is to be noted that when the clamp 14 is being used, the parts are arranged as shown in FIGURE 1, so that by manually rotating the screw member 19 by means of the handle 20, the wedge-shaped block 25 will engage the inner surface of the door or window jamb, while the jaws 29 will engage the outer surfaces of the members 11 and 12. Continued tightening of the handle 20 will cause the members 29 and 25 to exert a clamping action on the members 11 and 12 and the wedge-shaped block 25 is adapted to be provided with a friction creating material 31 which may be sand paper, rubber, plastic or the like in order to increase the holding power thereof.

As the handle 20 is manually turned, the screw member 19 will rotate in the bearing 18, and since the screw member 19 is fastened to the support member 21, it will be seen that the space between the pair of spaced apart jaws 29 and the block 25 can be varied or changed as desired. The curved flanges 26 slidably receive or engage the portion 16 of the body member 15 so as to act as guides for the parts during their movement.

The parts can be made of any suitable material and in different shapes or sizes.

As shown in FIGURE 1 the Y-shaped arm arrangement is sufficiently long to permit the user full view of the joint 13 to see if it fits properly.

Thus, it will be seen that there has been provided a miter casing clamp to be used by carpenters and the like for bringing mitered door and window casings together tightly and wherein such members will be held firmly in place while they are being nailed so as to assure a perfectly tight joint between the parts. The angle between the arms 28 is seventy-five degrees and the ends of the casing are forced together as the screw bolt is turned so as to force the wedge-shaped block 25 against the jamb. The provision of the flanges 26 and associated parts serve to guide the members so as to keep the block 25 properly aligned. The sand paper, rubber or the like 31 serves to prevent slippage of the parts.

Minor changes in shape, size and rearrangement of details coming within the field of invention claimed may be resorted to in actual practice, if desired.

What is claimed is:

In a clamping tool for positioning mitered end portions of casing members relative to a door or window opening, a body member having jaws at one end thereof adapted to engage adjacent mitered end portions of casing members, and a block connected to said body for movement toward and away from said jaws, said block being disposed on the same side of said body as said jaws in offset relation relative to said jaws and spaced from said body a distance at least equal to the height of said jaws, said block being adapted to engage the portion of a door jamb adjacent said mitered end portions of casing members when said casing members are engaged by said jaws.

References Cited in the file of this patent
UNITED STATES PATENTS

| | | |
|---|---|---|
| 812,699 | Stevens | Feb. 13, 1906 |
| 1,015,171 | Goble | Jan. 16, 1912 |
| 1,246,466 | Reeves | Nov. 13, 1917 |
| 1,416,874 | Reeves | Mar. 23, 1922 |
| 2,366,350 | Ostling | Jan. 2, 1945 |
| 2,669,957 | De Vogt | Feb. 23, 1954 |
| 2,723,692 | Tierney | Nov. 15, 1955 |
| 2,776,683 | Cowley | Jan. 8, 1957 |